United States Patent
Arnott et al.

[11] Patent Number: 5,837,301
[45] Date of Patent: Nov. 17, 1998

[54] INJECTION MOLDING MACHINE HAVING A HIGH SPEED TURRET

[75] Inventors: Robin A. Arnott, Alliston; William James Andrew Jacovich, Newmarket, both of Canada

[73] Assignee: Husky Injection Molding Systems Ltd., Canada

[21] Appl. No.: 847,895

[22] Filed: Apr. 28, 1997

[51] Int. Cl.⁶ ..................................... B29C 45/16
[52] U.S. Cl. .................. 425/574; 264/297.8; 264/328.8; 264/328.11; 425/451.5; 425/451.6; 425/576; 425/589; 425/592; 425/593
[58] Field of Search ................. 425/130, 572, 425/574, 575, 576, 589, 590, 592, 593, 451.5, 451.6, 450.1; 264/297.8, 328.8, 328.11

[56] References Cited

U.S. PATENT DOCUMENTS

| | | |
|---|---|---|
| 2,333,056 | 10/1943 | Thoreson et al. . |
| 3,730,665 | 5/1973 | Fortin et al. . |
| 3,833,329 | 9/1974 | Ulmachneider et al. . |
| 3,881,855 | 5/1975 | Farkas . |
| 3,988,100 | 10/1976 | Julien . |
| 4,243,362 | 1/1981 | Rees et al. . |
| 4,330,257 | 5/1982 | Rees et al. . |
| 4,363,619 | 12/1982 | Farrell . |
| 4,370,124 | 1/1983 | Buja . |
| 4,427,359 | 1/1984 | Fukuoka et al. . |
| 4,444,711 | 4/1984 | Schad . |
| 4,449,913 | 5/1984 | Krishnakumar et al. . |
| 4,734,023 | 3/1988 | Nesch et al. . |
| 4,836,767 | 6/1989 | Schad et al. . |
| 5,033,955 | 7/1991 | Faig et al. ................. 425/589 |
| 5,238,389 | 8/1993 | Brandau et al. .......... 425/451.6 |
| 5,314,327 | 5/1994 | Stein . |
| 5,336,462 | 8/1994 | Wohlrab . |
| 5,338,171 | 8/1994 | Hayakawa et al. . |
| 5,383,780 | 1/1995 | McCready et al. . |
| 5,728,409 | 3/1998 | Schad et al. ................. 425/130 |

*Primary Examiner*—Tim Heitbrink
*Attorney, Agent, or Firm*—Bachman & LaPointe, P.C.

[57] ABSTRACT

An injection molding machine of the present invention includes a first mold half having one of at least one mold cavity and at least one mold core and a rotatable turret block rotatable on an axis for rotating at least one movable mold half thereof into alignment with the first mold half. Each of the movable mold halves include one of at least one mold cavity and at least one mold core matable with the first mold half for forming a mold for molding a molded article. The rotatable turret block is further for clamping the movable mold halves and the first mold half together. The machine further includes a mechanism for moving the rotatable turret block relative the first mold half and a mechanism for rotating the rotatable turret means, wherein the mechanism for moving is linked to the mechanism for rotating, and a first injector for injecting melt into the at least one mold cavity.

9 Claims, 7 Drawing Sheets

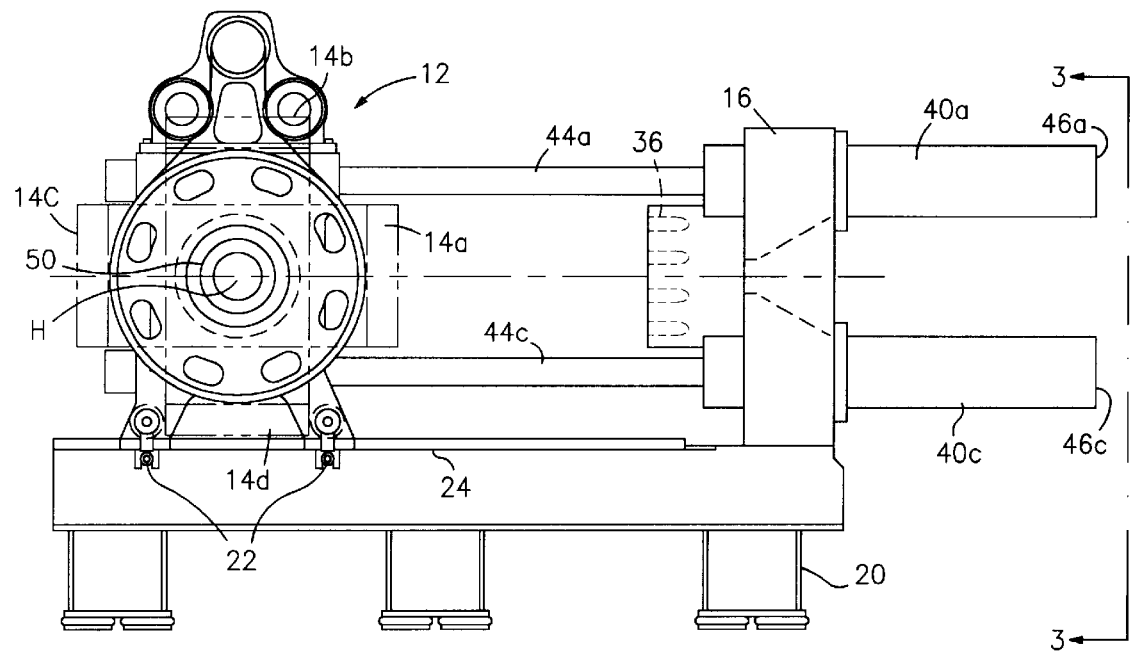
FIG. 2
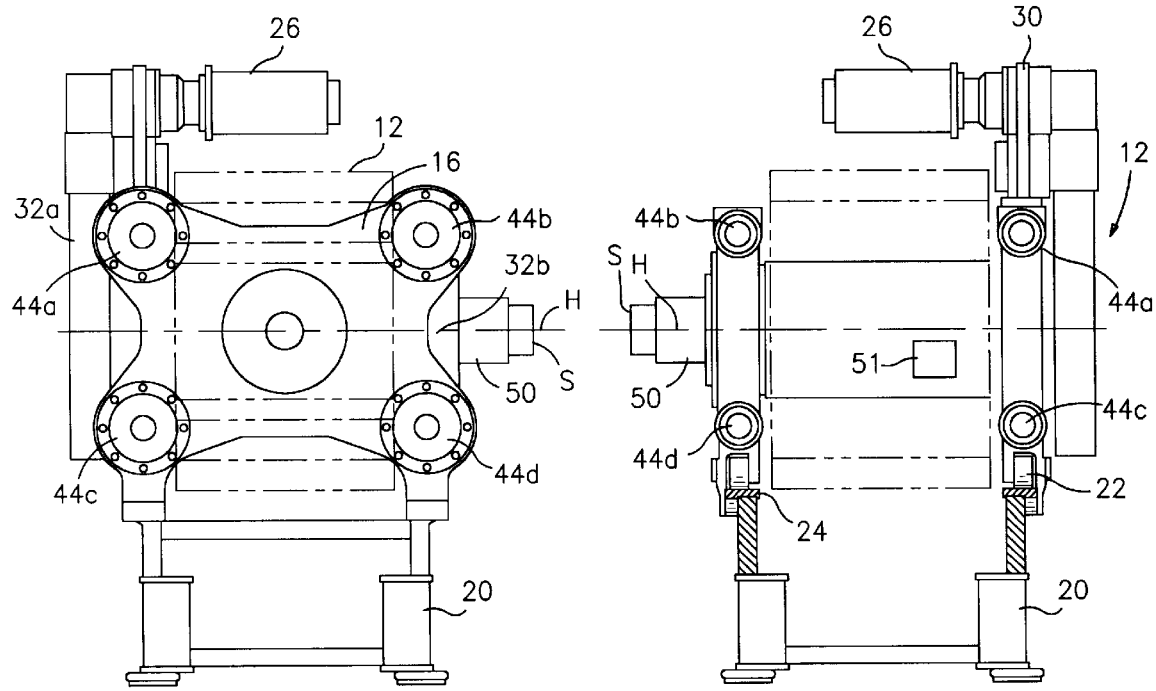
FIG. 3
FIG. 4

INJECTION MOLDING MACHINE HAVING A HIGH SPEED TURRET

BACKGROUND OF THE INVENTION

This invention is directed to a turret style injection molding machine, and more particularly, to an injection molding machine having a rotating and longitudinally movable turret block with at least one mold half rotatable and movable into engagement with a non-rotatable mold half.

Injection molding machines having turret configurations for moving mold halves into and out of alignment with other mold halves are well known in the prior art. A turret type configuration for injection molding is beneficial since it lends itself to high volume production of molded parts. This is true since different molding related operations can be performed using the turret configuration, simultaneous to the actual molding of the part. That is, while one part is being molded on the turret block, another part having already been molded or to be molded can be subjected to a plurality of post molding or pre-molding operations. These operations include, for example, injecting, holding, cooling and ejecting, each of which can be performed at a different angular position relative the turret block.

The following patents disclose turret style injection molding machines wherein the turret has a vertical axis of rotation.

U.S. Pat. No. 4,734,023 to Nesch et al. discloses an injection molding machine which uses a four to eight sided turret block that rotates about a vertical axis and which is mounted between the stationary and moving platens of the machine. The turret is also slidable on lower tie bars between the platens.

U.S. Pat. No. 4,427,359 to Fukuoka discloses an injection stretch blow molding machine. The machine incorporates a four sided turret block positioned on a vertical axis wherein preforms are injection molded in a first position of the four sided turret block. Preforms are temperature conditioned inside a second conditioning mold at a second position of the block. The preforms are blow molded at a third position and ejected at a fourth.

U.S. Pat. 4,449,913 to Krishnakumar discloses a rotary injection turret for use in making preforms. The patent teaches a turret block rotatable on a vertical axis, which block uses two of the turret block positions for post mold treatment of preforms while the preforms are still on mold cores. Accordingly, after injection, hold and some cooling at a first station, the turret block rotates to a second position where cooling fluid is blown onto the exterior surface of the preforms in order to cool the preforms. At a third position, the preforms are inserted into a conditioning mold from the turret block where the gate vestige is trimmed and further temperature conditioning is performed.

Additional patents which disclose vertical axis turrets are U.S. Pat. No. 4,444,711 to Rees; U.S. Pat. No. 4,330,257 to Rees; U.S. Pat. No. 4,363,619 to Farrell; U.S. Pat. No. 3,833,329 to Ulmachneider; and U.S. Pat. No. 2,333,056 to Thoreson.

The following patents disclose injection molding machines using rotary turret block each of which have a horizontal axis of rotation.

U.S. Pat. No. 4,836,767 to Schad et al. discloses a swing plate molding machine. The swing plate molding machine includes two core mold halves and one single cavity mold half. During molding, parts are caused to remain on the cores of the mold halves and are swung to an outboard position where the parts are transferred into a four sided turret block arrangement for continued cooling. The turret rotates on a horizontal axis and may contain a mechanism for temperature conditioning at one of its stations.

U.S. Pat. No. 4,370,124 to Buja discloses a modular rotary molding machine. The rotary style machine disclosed has a wheel which rotates about a horizontal axis. The entire wheel and additional assembly is mounted on a movable carriage with respect to a fixed injection unit. The diameter of the wheel is adjustable to vary the number of molds processed. Each mold thereon is filled individually and then clamped and packed by units positioned on board the wheel.

U.S. Pat. No. 4,243,362 to Rees discloses a composite molding apparatus for molding articles from two materials. The apparatus includes a four sided turret block rotatable between two opposed faces about a horizontal axis. The block is mounted slidably between a fixed and a moving platen of a horizontal injection molding machine. Two material molding is achieved by injecting different materials from separate injectors when the block is in each of two positions.

Additional turret style injection molding machines having a horizontal axis of rotation include U.S. Pat. No. 3,988,100 to Julien; U.S. Pat. No. 3,881,855 to Farkas; and U.S. Pat. No. 3,730,665 to Fortin.

The prior art also includes a plurality of two platen injection molding machines, some of which are discussed as follows.

U.S. Pat. No. 5,338,171 to Hayakawa discloses a die clamping apparatus with an aligning device. The apparatus includes a two platen clamp with alignment means provided by vertically adjustable trunnions under the movable platen. The trunnions are moved by cylinders which respond to deflection signals sensed at the ends of outriggers mounted to the moving platen.

U.S. Pat. No. 5,336,462 to Wohlrab discloses a mold closing apparatus for an injection molding machine. The machine includes a two platen clamp in which stroke cylinders are positioned inside tie bars, the ends of which also act as clamp pistons.

U.S. Pat. 5,314,327 to Stein discloses a mold clamp for an injection molding machine. The machine includes a two platen clamp with means to help align the mold halves. Adjustable rollers are used on a moving platen carriage and adjusting means are built into the carriage/moving platen assembly for improving alignment.

With respect to the prior art discussed above, no injection molding machines are disclosed having the objects and advantages discussed below and derived from the device disclosed herein. That is, each of the prior art devices discussed above has a relatively complex construction, requiring multiple mold platens and a greater number of moving parts. Accordingly, these devices inefficiently use excess floor space, exhibit greater energy consumption, and have relatively long cycle times.

U.S. patent application Ser. No. 08/611,362 discloses a turret molding machine using an electric servo drive to rotate the turret.

There exists a need, therefore, for an injection molding machine having a turret clamp with at least one movable platen, wherein the turret clamp is rotatable on a horizontal axis and longitudinally movable for placement into and out of engagement with another platen, thereby reducing floor space usage and energy consumption and increasing efficiency.

SUMMARY OF THE INVENTION

The primary object of this invention is to provide an energy and space efficient injection molding machine having a reduced cycle time which includes a longitudinally movable and rotatable turret block.

Another object of this invention is to provide a two platen injection molding machine including a longitudinally movable and rotatable turret block, wherein the longitudinal and rotational movements are efficiently interrelated, thereby reducing cycle time.

Yet another object of this invention is to provide an energy, cycle time and space efficient two platen injection molding machine having a rotatable turret block.

And yet another object of this invention is to provide a two platen injection molding machine using a movable and rotatable turret block which includes at least one and preferably two mold halves movable toward and away from a mating stationary mold half for forming molds for injection molding parts in an energy and cycle time efficient manner.

Further objects and advantages of the present invention will appear hereinbelow.

The disclosed objects and advantages are achieved by the injection molding machine of the present invention. The machine comprises a first mold half having one of at least one mold cavity and at least one mold core and a rotatable turret block rotatable on an axis for rotating at least one movable mold half thereof into alignment with the first mold half. Each of the movable mold halves includes one of at least one mold cavity and at least one mold core matable with the first mold half for forming a mold for molding a molded article. The rotatable turret block is further for clamping the movable mold halves and the first mold half together. The machine further includes means for moving the rotatable turret block relative the first mold half and means for rotating the rotatable turret means, wherein the means for moving is linked to the means for rotating, and a first injection means for injecting melt into the at least one mold cavity.

The details of the present invention are set out in the following description and drawings wherein like reference characters depict like elements.

BRIEF DESCRIPTION OF THE DRAWINGS

FIG. 2 is a partial elevational side view of a turret injection molding machine of FIG. 1 in an open position;

FIG. 3 is an end partially cross-sectional view taken along line 3—3 of FIG. 2;

FIG. 4 is an end view taken along line 4—4 of FIG. 1;

DETAILED DESCRIPTION OF THE PREFERRED EMBODIMENT

Figure 1:
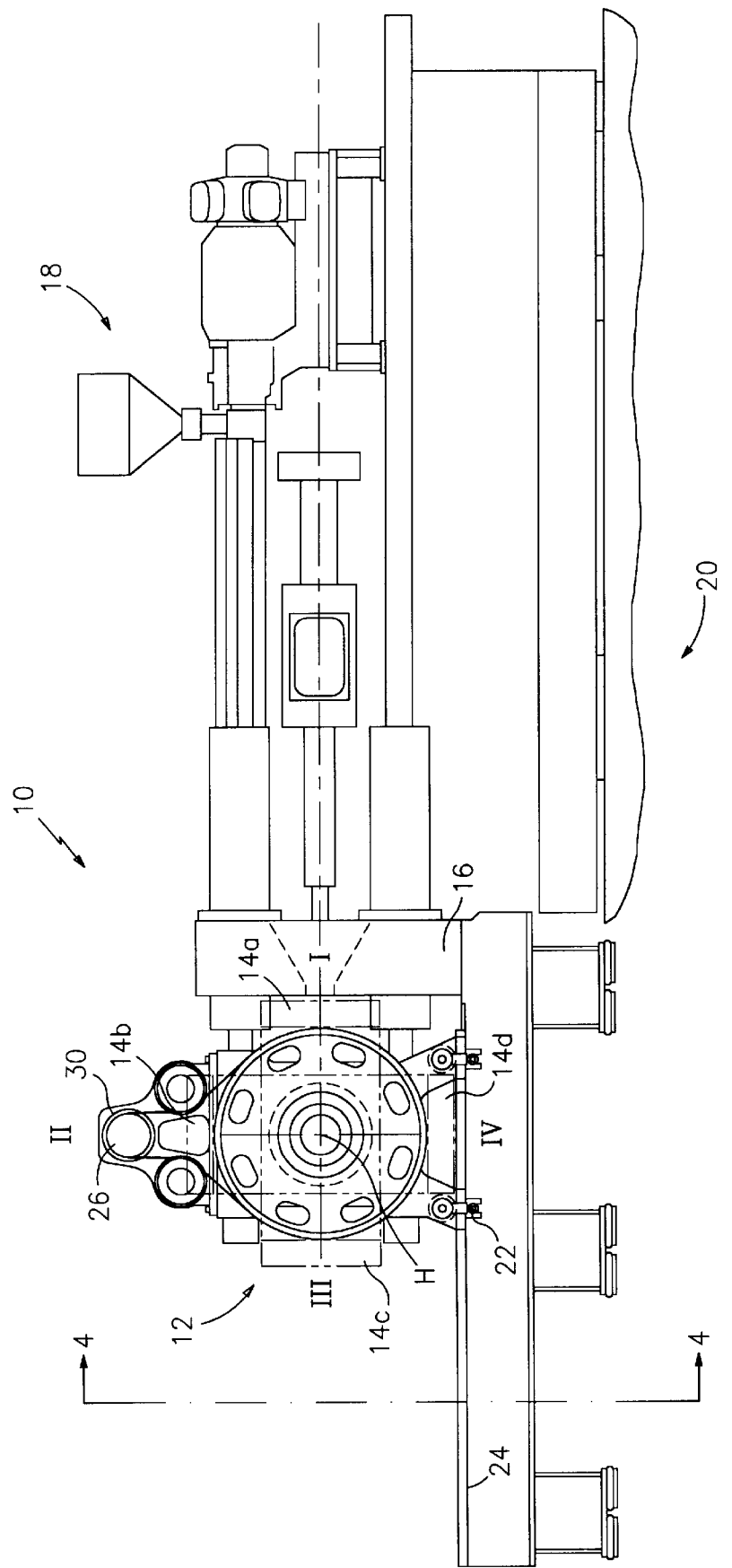
FIG. 1 is a side elevational schematic view of a turret injection molding machine in a closed position.

Referring now to the drawings in detail there is shown in FIG. 1 an elevational and schematic side view of a turret injection molding machine used in the present invention, which is designated generally as 10. Injection molding machine 10 generally includes a rotatable turret block 12 with a plurality of movable mold halves 14a–14d, a stationary mold half and platen 16 and injection unit 18, all positioned on base 20.

Injection molding machine 10 may be used for molding a variety of different types of articles and accordingly, is not limited for use with any particular type of article. Preforms are referred to throughout this description by way of example only.

While the turret block is shown throughout this description as rotatable on a horizontal axis, and this is the preferred embodiment, it is feasible that a similar design of a movable turret block providing the clamping action may be provided which is rotatable on a vertical axis. Accordingly, this invention is not considered limited to the horizontal axis feature.

As shown in FIGS. 1–5, turret block 12 is preferably longitudinally movable on base 20 via a set of rollers 22 attached to the bottom of the turret block and thereby providing a mold clamp force. Base 20 includes hardened ways 24 which engage rollers 22, wherein rollers 22 engage the underside of ways 24 so as to counteract upward forces and tipping forces that may act on the turret block assembly. Turret block 12 is rotatable as shown in FIGS. 1–5 by a motor, as an electric servo drive motor 26 and preferably on a horizonal axis H through arcuate sectors as shown in FIGS. 1–5 of substantially 90°. Preferably, the electric servo drive motor 26 is connected via a belt drive 30 to axis H for rotating turret block 12, as shown in FIG. 4, while the electric servo drive motor is preferably mounted on one of turret block carriages 32a and 32b extending from base 20.

Figure 5:
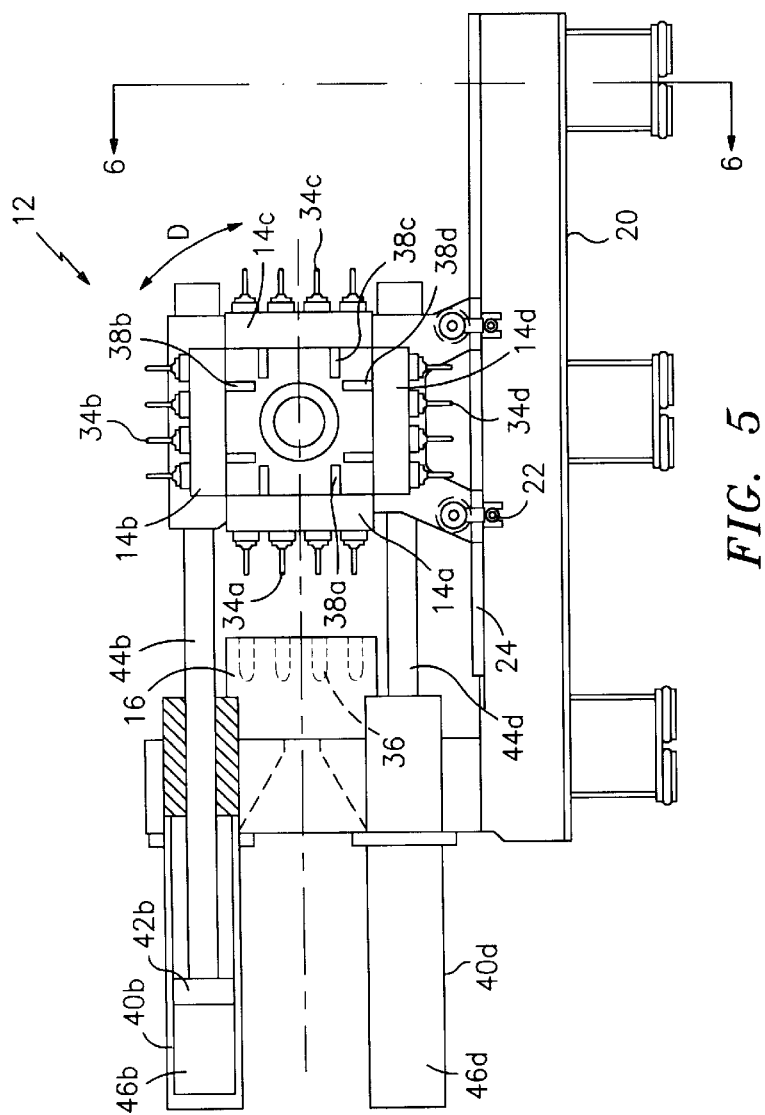
FIG. 5 is a side elevational and partially cross-sectional view from the side opposite of that shown in FIG. 2 with the injection molding machine in the partially open position.

As shown in FIG. 5, turret block 12 includes a plurality of movable mold halves, i.e. movable mold halves 14a–14d each of which includes a set of mold cores 34a–34d, respectively, each set having at least one mold core, adapted for engagement with a set of mold cavities 36, each set including at least one mold cavity and located in stationary mold half and platen 16. As shown in FIGS. 1–5, four movable mold halves or faces 14a–14d are provided on turret block 12, although any number supportable by the size of the turret block 12 can be used. Sets of mold cores 34a–34d are adapted to be rotated into horizontal and vertical alignment with sets of mold cavities 36.

Referring still to FIG. 5, turret block 12 includes sets of ejector pistons or stripper rings 38a–38d, and a system for the operation thereof, which operate on sets of mold cores 34a–34d and strippers positioned on movable mold halves 14a–14d, respectively. Accordingly, sets of ejector pistons or stripper rings 38a–38d are positioned within turret block 12 and parallel to sets of mold cores 34a–34d and perform the function of stripping the mold cores of finished molded articles, for example, preforms. Each movable mold half and platen 14 includes at least one ejector piston in each set 38a–38d for stripping finished articles from sets of mold cores 34a–34d. For the detailed design of the ejector piston or stripper ring system for use with sets 38, reference is made to U.S. Pat. No. 5,383,780, issued Jun. 24, 1995, to the assignee of the present invention, for incorporation by reference of a design of the ejector piston or stripper ring system, particularly column 4, line 29, to column 7, line 6, and FIGS. 1–8. Preferably, the ejector piston or stripper ring system is actuated via the hydraulic services supplied to the turret block. The hydraulically actuated ejector piston or stripper ring system actuated by on board hydraulic services is the preferred design, however, other designs may be used.

Figure 6:
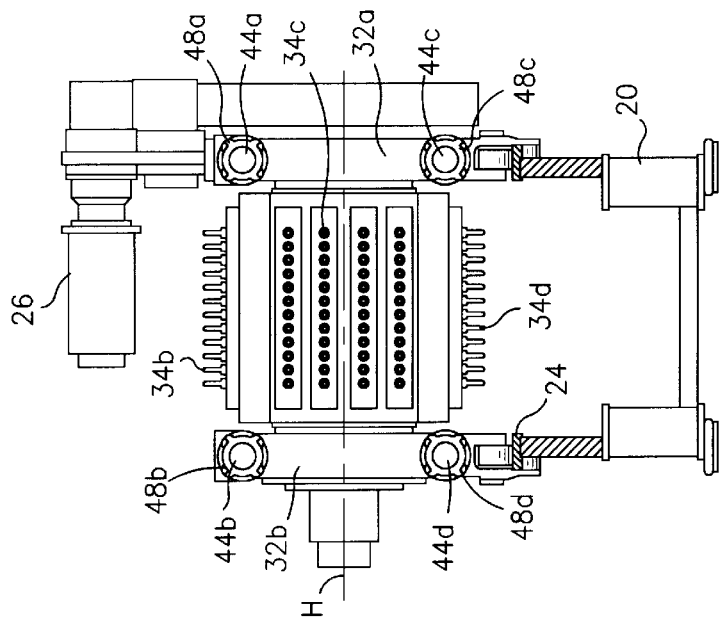
FIG. 6 is an end elevational and detailed view taken along line 6—6 of FIG. 5.

Turret block 12 is movable backward and forward along hardened ways 24 on base 20 via piston/cylinder assemblies 40a–40d positioned in stationary mold half and platen 16, as shown in FIG. 5. Preferably four piston/cylinder assemblies 40a–40d, as shown in FIGS. 2, 3 and 5, are used which are positioned in the corners of stationary mold half or platen 16. Each piston/cylinder assembly 40a–40d includes a piston 42a–42d (42a, 42c and 42d not shown), which pistons 42a–42d are attached to tie bars 44a–44d, respectively, which tie bar acts as the piston shaft. Accordingly, tie bars 44a–44d extend from the piston/cylinder assemblies 40a–40d and are connected at an opposite end to turret block 12. In order to move turret block 12 backward and forward relative stationary mold half and platen 16, pressurized fluid is forced into cylinders 46a–46d against pistons 42a–42d, respectively. The side of pistons 42a–42d in which pressurized fluid is forced against, determines the direction in which turret block 12 moves relative stationary mold half and platen 16, that is, either into an open or closed position, shown in FIGS. 2 and 5, respectively. Tie bars 44a–44d pass through the turret block carriages 32a and 32b and are attached thereto via retaining nuts 48a–48d, as shown in FIG. 6, respectively.

Services S, shown schematically in FIG. 3 and 4, are provided to turret block 12 via a rotary union 50, also shown schematically. Accordingly, as turret block 12 rotates, services S are continuously supplied to the movable mold halves 14a–14d. Such services S include the supply of electricity, pressurized fluid, cooling fluids, and hydraulic fluids, etc. For using these services, turret block 12 also includes the required circuitry and control valves 51 (shown schematically) on board and movable and rotatable with the turret block.

Injection unit 18, preferably in the form of a reciprocating screw injection unit, is connected with stationary mold half and platen 16 positioned on base 20 for providing melt to the mold cores for molding. Injection unit 18 is preferably movable into and out of engagement with stationary mold half and platen 16 by means of carriage cylinders (not shown) on rollers and hardened ways, similar to as described above for use with turret block 12. If desired, injection molding machine 10 of the present invention can provide co-injection of articles, for example, preforms. For this arrangement, two conventional reciprocating screw injection units are used to feed two different kinds of resins into conventional mold cavities, such as those shown in stationary mold half and platen 16, which mold half and platen 16 may include a two material hot runner system which delivers both resins into each mold cavity within stationary mold half and platen 16 for molding multi-layered articles, for example, preforms.

In accordance with the preferred embodiment of the present invention, a two faced turret block is rotated through 180 degrees during the combined clamp open and close motions to present alternating mold cores to the mold cavity. A mechanical linkage creates the rotary motion using the clamp opening and closing motions. A partial stroke position means may be provided to allow the mold cores to clear the mold cavities before rotation is permitted.

FIGS. 1–6 teach the basic principle of the turret machine in which the carriage and turret block perform all the functions of a conventional clamp, opening, closing and clamping the mold, ejecting the parts and providing services to the mold's core halves. The same carriage and turret structure including the same linear motion means, tiebar clamping, part ejection means and services provided may be incorporated in FIGS. 7–16 described schematically hereinbelow.

In the preferred embodiment of the present invention, described in FIGS. 7–16 hereinbelow a two-sided turret block is used instead of a four sided turret block and different means are used to rotate the turret block. An advantage of this configuration is that molding cycle time can be substantially reduced, thus allowing the turret layout to be used for high speed molding applications. An additional advantage in this configuration is a substantial cost savings in the construction of the machine as an automatic mechanical means for the rotary motion utilizing existing actuators is used in place of an expensive electric servo drive and associated controls.

Figure 7:
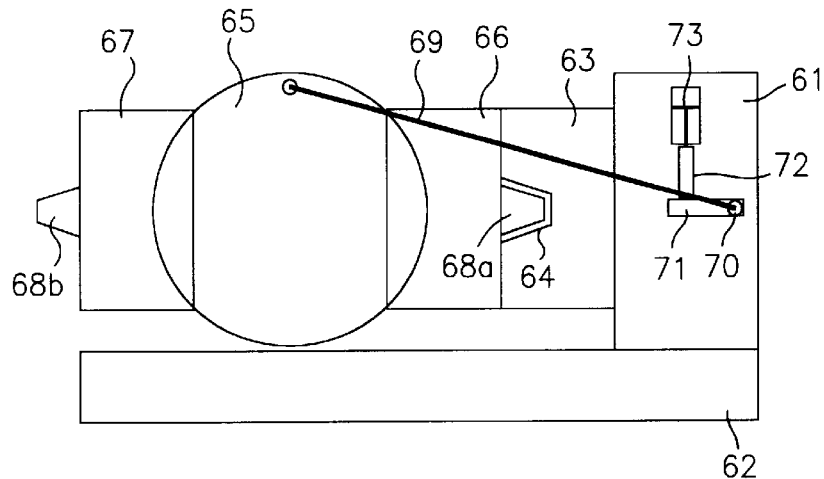
FIG. 7 is a schematic view of the turret injection molding machine of the present invention in the closed and clamped position.

FIG. 7 shows a turret clamp similar to that disclosed in FIGS. 1–6. The injection unit is not shown. A fixed platen 61 is mounted on the clamp base 62 and supports mold stationary half 63, which includes cavity 64. A turret block 65 is mounted on journals carried in a movable carriage, not shown. The block carries two mold halves 66 and 67 and typically the cores 68a and 68b. The turret block is connected via a linkage means, as rod 69, to a sliding plate 70, that slides in a track 71, mounted to the fixed platen 61. Blocking plate 72 and associated actuating cylinder 73 are also mounted to the fixed platen such that the plate 72 can block the sliding plate 70 in one of its positions.

Although FIG. 7 shows a single core 68a and 68b attached to each mold half 66 and 67, respectively, naturally, a plurality of cores can be employed mating with a plurality of cavities, as in FIGS. 1–6.

Figure 8:
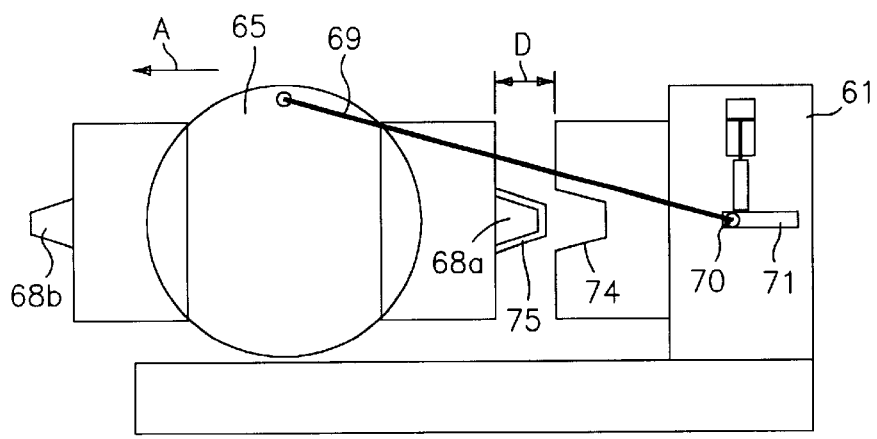
FIGS. 8—9 are schematic views of the turret injection molding machine of FIG. 7 in a partial open position and full open position, respectively.

FIG. 8 shows the turret block 65 moving away, indirection of arrow "A" from the fixed platen 61 by means of conventional cylinders, not shown. As the block moves the rod 69 and sliding plate 70 move with it until the sliding plate 70 reaches the end of the travel permitted by track 71. This distance corresponds to the mold opening distance "D" that is required in order for the core 68a, and molded part 75 thereon, to clear the cavity 74 before rotation of the core is permitted. The turret block continues to move in the direction of arrow "A" and now because the end of rod 69 is blocked from further motion the turret is caused to rotate in a clockwise direction in the direction of arrow "B", see FIG. 9.

Figure 9:
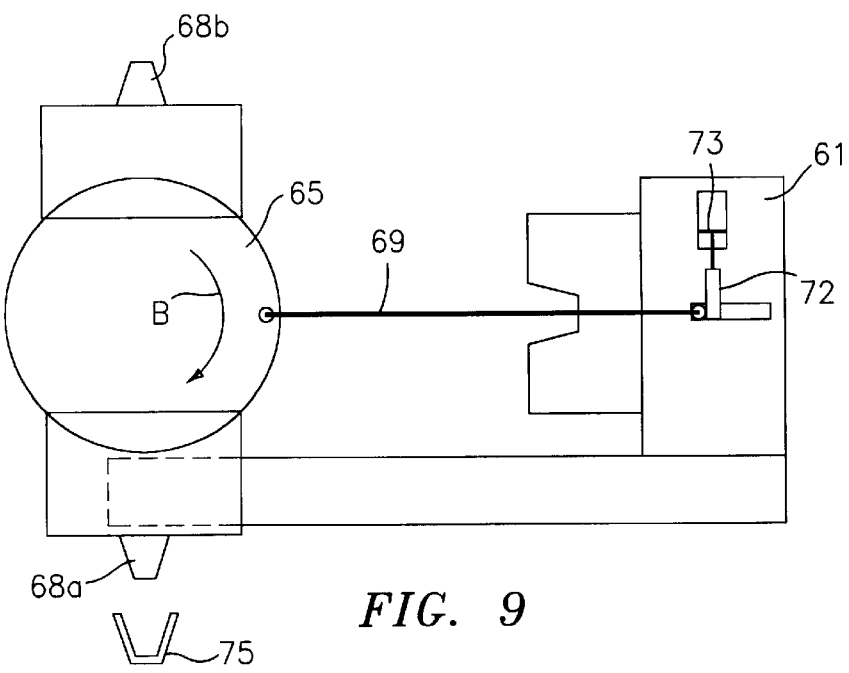

FIG. 9 shows the turret 65 having moved to its furthest position away from the fixed platen 61 and rod 69 has caused a rotation of 90 degrees of the block. At any point after beginning rotation of the block the molded part 75 can be ejected from the core 68a by conventional means, such as mechanical stripping or air ejection. Thus ejection of the part occurs "on the fly" without stopping rotation of the turret block. The ejected parts fall under the mold and are captured in a take away conveyor underneath the machine, not shown.

Figure 10:
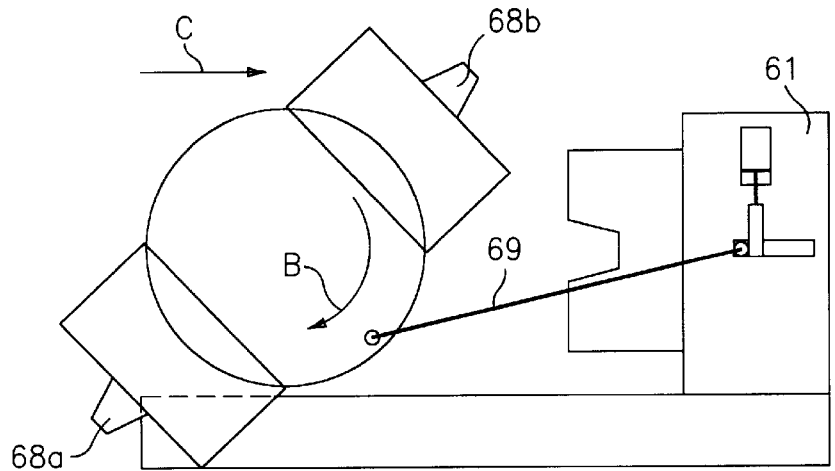
FIG. 10 is a schematic view of the turret injection molding machine of FIG. 9 in a partially rotated and partially closed position.

The rotary inertia induced in the turret causes the clockwise rotation to continue. Meanwhile the actuating direction of the conventional cylinders used to move the turret block is reversed, now causing the block to move toward the fixed platen. Simultaneously blocking plate 72 is moved by actuator 73, to block the motion of the sliding plate 70, thus causing rod 69 to continue to cause the turret block to continue to rotate clockwise. FIG. 10 shows this condition in which the turret block 65 is now moving towards the fixed platen 61 in direction of arrow "C" while clockwise rotary motion continues. The second set of cores 68b are now brought into alignment with the cavities 74.

Figure 14A:
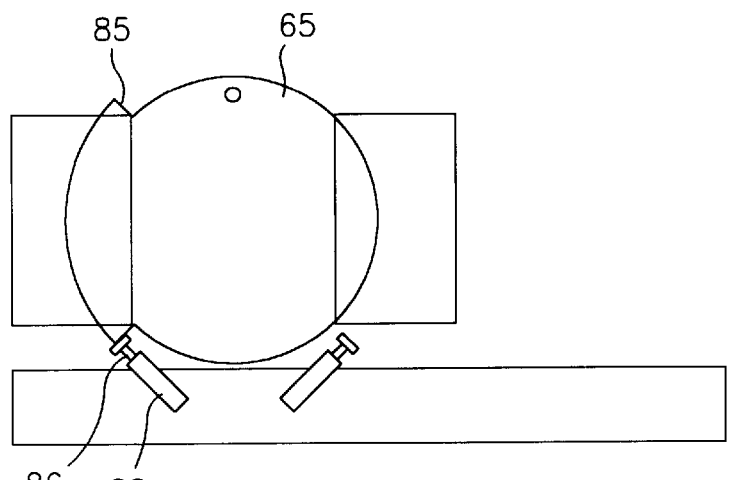
FIGS. 14A—14B are schematic views of the turret injection molding machine of FIG. 7 showing the turret rotation blocking means.
Figure 14B:
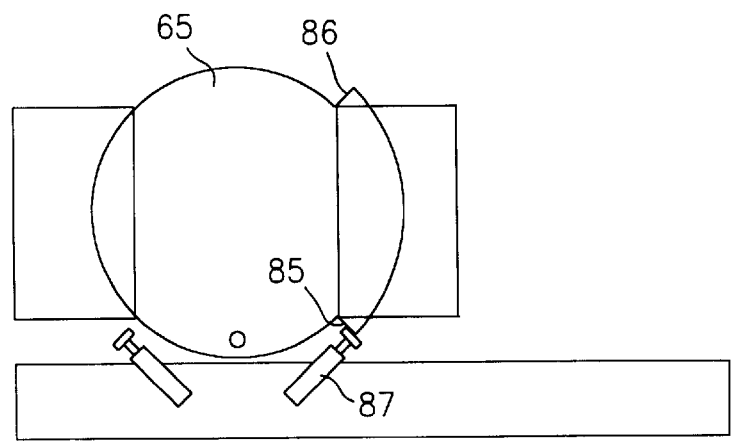

FIGS. 14A and 14B show a preferred means of stopping the rotary motion of the block 65 quickly and accurately. The block has stopping faces 85 and 86 thereon which contact energy absorbers and positioning blocks 87 and 88, respectively, that are mounted on the turret carriage. Thus, the block rotates through 180 degrees and is accurately stopped and aligned for mold closing in each of its two positions. The block rotates clockwise on one cycle and then anti-clockwise on the subsequent cycle and alternately presents the two core sets 68a and 68b to the mold cavity 74.

Figure 11:
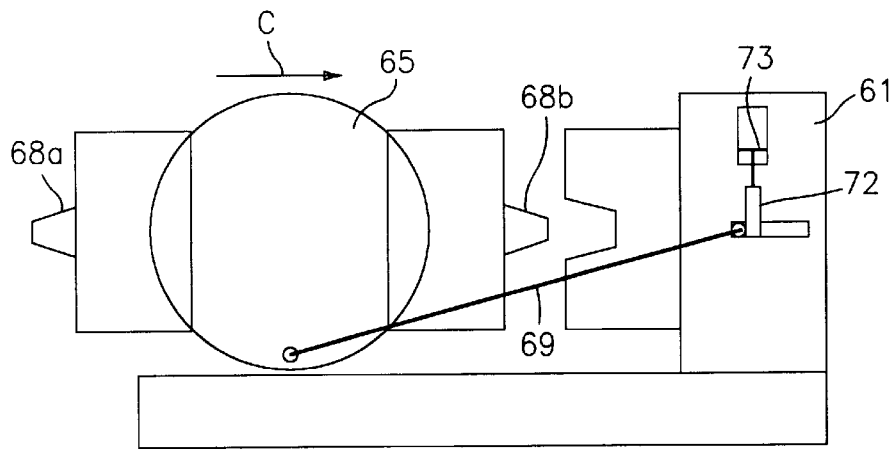
FIGS. 11—12 are schematic views of the turret injection molding machine of FIG. 10 in further operating stages.
Figure 12:
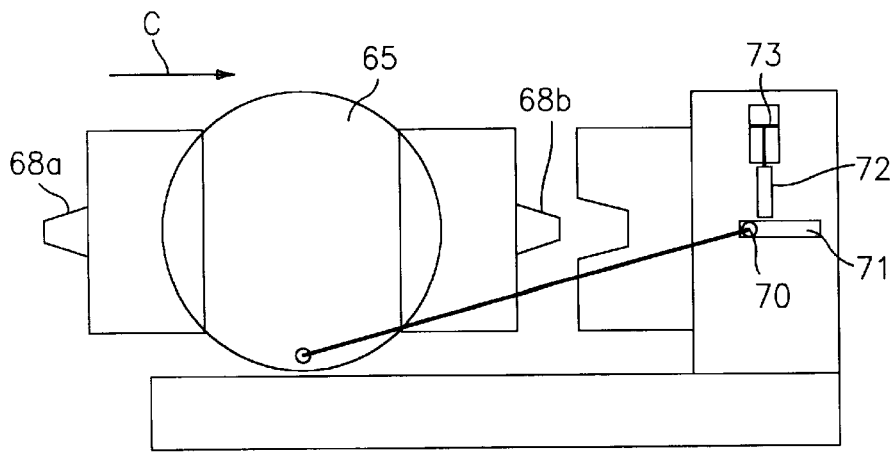
Figure 13:
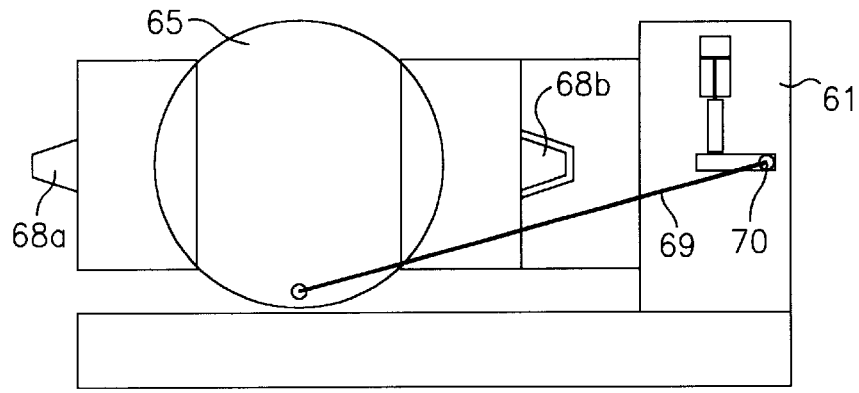
FIG. 13 is a schematic view of the turret injection molding machine of FIG. 12 in the closed and clamped position.

FIG. 11 shows the rotation of the block 65 completed and stopped while the turret block 65 continues to move toward the fixed platen 61 in the direction of arrow "C". At the same time as rotation is stopped, blocking plate 72 is withdrawn by actuator 73, permitting sliding plate 70 to slide in track 71. This is shown in FIG. 12. The mold is closed and clamped ready for the next molding cycle to start as shown in FIG. 13.

Figure 15:
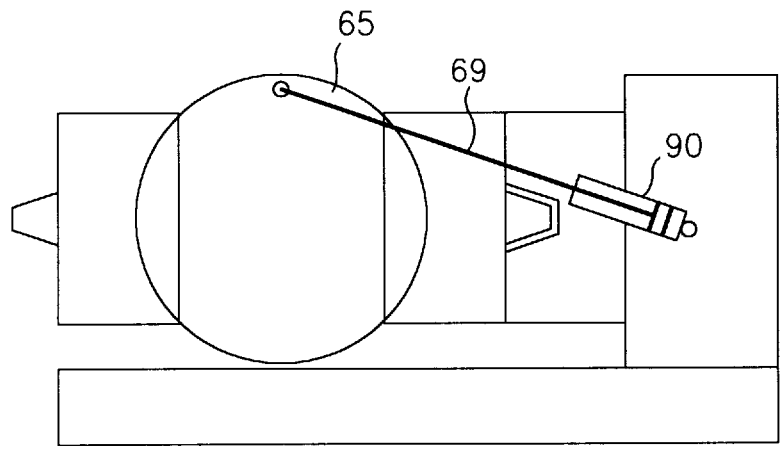
FIGS. 15—16 are schematic views of the turret injection molding machine of the present invention showing alternate turret open motion control means.
Figure 16:
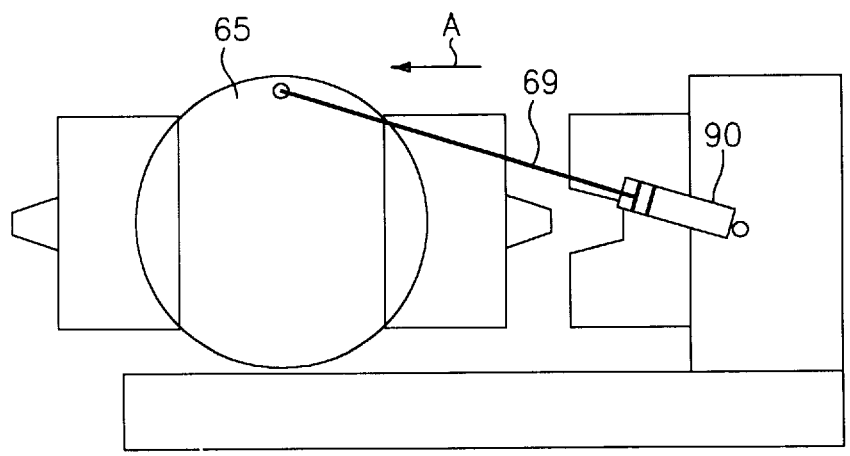

FIG. 15 shows an alternate means of handling the initial mold open motion without rotation. In this configuration, rod 69 includes a cylinder 90 having sufficient stroke to permit mold open motion stroke "D" as shown in FIG. 8. Thus as the turret block 65 is moved away from the fixed platen by conventional cylinders not shown, cylinder 90 is energized to extend the length of rod 69. FIG. 16 shows cylinder 90 at its second position and rod 69 fully extended without rotation of the block having occurred. Likewise in the closing sequence described above, cylinder 90 would be energized to keep rod 69 fully extended until rotation was complete and then cylinder 90 would be de-energized to permit rod 69 to shorten in length as the cylinders completed the mold closing stroke.

The mechanical rotary means shown here is substantially less costly than the electric servo drive means and its controls shown in FIGS. 1–6. Furthermore, because the mechanical means is linked to the opening and closing means no time is lost starting and stopping rotation, these actions occur simultaneously as the opening and closing motions of the turret block occur. In addition, ejection of the parts can occur during rotation of the block, again precluding the need to stop turret block motion during ejection. The accumulation of these time saving elements constitute a substantial saving in overall cycle time and make the machine competitive when compared to conventional machines used for molding thin wall articles in high speed cycles, typically 5 seconds or less. Other advantages then become factors when comparing this high speed turret machine with conventional high speed thin wall molding machines. These including the following:

(1) Reduced footprint—The size of the turret machine clamp is substantially smaller than a conventional machine for a given clamp force. Thus output/floorspace is higher.

(2) Solid backup of mold cores—The solid turret block on which the mold cores are mounted supports the entire mold area and constitutes a stiffer, better supported structure than the moving platen structure used on conventional machines. Better quality and thinner parts can therefore be produced on the turret machine.

(3) Additional operations are possible without incurring cycle time penalty.—The second core half on the turret machine is available during molding time on the first core for additional operations without penalizing cycle time. For example, liners, or labels can be loaded onto the core and used to mold a composite article, or a blow molding or automated part take off function can be performed after molding during the next cycle without time penalty.

In accordance with the present invention, the second station opposed to mold cavity 64 may be used for secondary operations, such as pre-molding or post-molding operations, as temperature conditioning, label loading, liner loading, a finished article removal mechanism, etc. Alternatively, the stationary mold half 63 and fixed platen 61 may be vertically positioned instead of horizontally positioned as shown in FIG. 7.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An injection molding machine, comprising:

an injection molding machine having only two platens and including a first platen carrying a first mold half having one of at least one mold cavity and at least one mold core;

a second platen in association with said first platen, wherein said second platen is a rotatable turret means rotatable on an axis for rotating at least one movable mold half thereof into alignment with said first mold half, each of said at least one movable mold half including one of at least one mold cavity and at least one mold core matable with said first mold half for forming a mold for molding a molded article, said rotatable turret means further clamping said at least one movable mold half and said first mold half together;

means for moving said rotatable turret means, relative said first mold half, away from and towards said first platen and means for rotating the rotatable turret means, wherein the means for rotating includes a movable linkage means affixed to said turret operative to rotate said turret during the movement of said turret away from and towards said first platen; and a first injection means for injecting melt into said at least one mold cavity.

2. The injection molding machine according to claim 1, wherein the rotatable turret means includes two movable mold halves located approximately 180 degrees apart on said turret means.

3. The injection molding machine according to claim 1, including a fixed platen supporting said first mold half, wherein said movable linkage means is supported by said fixed platen.

4. The injection molding machine according to claim 3, wherein said linkage means is a rod.

5. The injection molding machine according to claim 4, including a track carrying said rod in said fixed platen permitting said rod to move a fixed distance corresponding substantially to the distance to open said mold cavity.

6. The injection molding machine according to claim 5, wherein said means for rotating includes said rod which is operative to cause rotation of said turret.

7. The injection molding machine according to claim 6, including blocking means operatively associated with said track to block movement of said rod in said track.

8. The injection molding machine according to claim 1, wherein said turret includes stopping faces that contact stopping means operative to stop rotary motion of said turret.

9. The injection molding machine according to claim 1, including means to eject molded parts during rotation of said turret.

* * * * *